US009727748B1

(12) United States Patent
Yaeger (10) Patent No.: US 9,727,748 B1
(45) Date of Patent: Aug. 8, 2017

(54) APPARATUS, METHOD, AND COMPUTER PROGRAM FOR PROVIDING DOCUMENT SECURITY (75) Inventor: Marc Todd Yaeger, Hoover, AL (US)

(73) Assignee: Open Invention Network LLC, Durham, NC (US)

( * ) Notice: Subject to any disclaimer, the term of this patent is extended or adjusted under 35 U.S.C. 154(b) by 247 days.

(21) Appl. No.: 13/462,258

(22) Filed: May 2, 2012

Related U.S. Application Data (60) Provisional application No. 61/481,822, filed on May 3, 2011.

(51) Int. Cl.
*G06F 17/30* (2006.01)
*G06F 21/62* (2013.01)
*H04L 29/06* (2006.01)

(52) U.S. Cl.
CPC ...... *G06F 21/6218* (2013.01); *G06F 21/6245* (2013.01); *H04L 63/10* (2013.01)

(58) Field of Classification Search
CPC .......... G06F 17/00; G06F 17/21; G06F 21/10; G06F 21/31; G06F 21/6218; G06F 21/6245; G06F 2221/2113; G06F 2221/2141; H04L 29/06632; H04L 29/06659; H04L 63/102
USPC ................................................. 726/28, 3, 27
See application file for complete search history.

(56) References Cited

U.S. PATENT DOCUMENTS

| | | | | |
|---|---|---|---|---|
| 5,835,919 | A * | 11/1998 | Stern et al. ................... 715/209 |
| 6,424,249 | B1 * | 7/2002 | Houvener ................... 340/5.82 |
| 7,694,148 | B2 * | 4/2010 | Cheng et al. ................. 713/183 |
| 8,145,668 | B2 * | 3/2012 | Van Der Linden et al. . 707/778 |
| 8,166,559 | B2 * | 4/2012 | Jones ................ G06F 17/30867 705/57 |
| 8,258,924 | B2 * | 9/2012 | Hind et al. .................... 340/10.1 |
| 8,347,398 | B1 * | 1/2013 | Weber ............................. 726/26 |
| 8,612,746 | B1 * | 12/2013 | Lee ............................... 713/155 |
| 8,756,705 | B2 * | 6/2014 | Homer .................... H04L 63/08 709/227 |
| 8,789,203 | B2 * | 7/2014 | Ahn ........................ G06F 21/10 726/26 |
| 8,813,255 | B2 * | 8/2014 | Abuelsaad .............. G06F 21/62 713/165 |
| 9,489,354 | B1 * | 11/2016 | Lee .......................... G06F 17/24 |
| 2003/0093760 | A1 * | 5/2003 | Suzuki et al. ................ 715/523 |

(Continued)

FOREIGN PATENT DOCUMENTS

CA 2338910 A1 * 10/2001
IL WO 02077847 A1 * 10/2002 ......... H04L 63/0245

(Continued)

OTHER PUBLICATIONS

Chapman, "Hiding the Hidden: A Software System for Concealing Ciphertext as Innocuous Text", 1997, 17 pages.*

(Continued)

*Primary Examiner* — Luu Pham
*Assistant Examiner* — Walter Malinowski
(74) *Attorney, Agent, or Firm* — Hanyes and Boone, LLP (57) ABSTRACT

An apparatus, method, and a computer program are provided to secure one or more sections of a document. For example, one or more sections of the document may be converted into secured content. The secured content may then be removed from the document, and replaced with replacement content in the document. This may prevent a viewer with no privileges from viewing secured content.

11 Claims, 10 Drawing Sheets

(56) References Cited

U.S. PATENT DOCUMENTS

| | | | |
|---|---|---|---|
| 2004/0003398 A1* | 1/2004 | Donian et al. | 725/34 |
| 2005/0138110 A1* | 6/2005 | Redlich | C07K 14/70575 709/201 |
| 2005/0288939 A1* | 12/2005 | Peled | G06F 21/10 709/229 |
| 2006/0005017 A1* | 1/2006 | Black | H04L 63/0428 713/165 |
| 2006/0075228 A1* | 4/2006 | Black | H04L 63/0428 713/167 |
| 2006/0247914 A1* | 11/2006 | Brener | G06F 17/274 704/1 |
| 2006/0259983 A1* | 11/2006 | Sperry | G06F 21/6245 726/28 |
| 2007/0208751 A1* | 9/2007 | Cowan et al. | 707/10 |
| 2007/0261116 A1* | 11/2007 | Prafullchandra et al. | 726/22 |
| 2007/0300076 A1* | 12/2007 | Diffie | G06F 21/46 713/184 |
| 2008/0002911 A1* | 1/2008 | Eisen | G06F 21/6245 382/283 |
| 2008/0025559 A1* | 1/2008 | Paxson | G06F 21/16 382/100 |
| 2008/0231040 A1* | 9/2008 | Gaffney et al. | 283/93 |
| 2008/0270807 A1* | 10/2008 | Forlenza et al. | 713/193 |
| 2009/0025063 A1* | 1/2009 | Thomas | G06F 21/6218 726/4 |
| 2009/0046848 A1* | 2/2009 | Booth | 380/28 |
| 2009/0063354 A1* | 3/2009 | Sheets et al. | 705/75 |
| 2009/0199185 A1* | 8/2009 | Slawson et al. | 718/100 |
| 2009/0225981 A1* | 9/2009 | Motohashi | G06F 17/30961 380/28 |
| 2009/0259588 A1* | 10/2009 | Lindsay | 705/40 |
| 2009/0307078 A1* | 12/2009 | Mithal et al. | 705/14.35 |
| 2010/0017625 A1* | 1/2010 | Johnson | G06F 12/1416 713/190 |
| 2010/0169304 A1* | 7/2010 | Hendricksen et al. | 707/723 |
| 2010/0185874 A1* | 7/2010 | Robles | G06F 21/6218 713/189 |
| 2010/0189251 A1* | 7/2010 | Curren | G06F 21/6227 380/28 |
| 2010/0214476 A1* | 8/2010 | Miyamoto et al. | 348/468 |
| 2010/0229246 A1* | 9/2010 | Warrington | G06F 21/6218 726/28 |
| 2010/0231797 A1* | 9/2010 | Jiang et al. | 348/607 |
| 2011/0016085 A1* | 1/2011 | Kuo | G06F 17/30212 707/615 |
| 2011/0093772 A1* | 4/2011 | Harrington | 715/234 |
| 2011/0191369 A1* | 8/2011 | Mehra | G06F 17/30014 707/769 |
| 2011/0239113 A1* | 9/2011 | Hung | G06F 19/3487 715/271 |
| 2011/0247081 A1* | 10/2011 | Shelton | 726/28 |
| 2012/0173690 A1* | 7/2012 | Cherkauer | H04L 63/102 709/223 |

FOREIGN PATENT DOCUMENTS

| | | | | | |
|---|---|---|---|---|---|
| IL | WO 02103461 A2 | * | 12/2002 | | G06F 17/22 |
| IL | WO 2004040464 A2 | * | 5/2004 | | G06F 21/10 |
| JP | 2004260750 A | * | 9/2004 | | |
| RU | 2010125304 A | * | 12/2011 | | |
| SG | WO 9948006 A1 | * | 9/1999 | | G06F 21/10 |
| WO | WO 9948006 A1 | * | 9/1999 | | G06F 12/14 |

OTHER PUBLICATIONS

Chang, "Linguistic Steganography Using Automatically Generated Paraphrases", Human Language Technologies: The 2010 Annual Conference of the North American Chapter of the ACL, Jun. 2010, pp. 591-599.*

Murphy, "Syntactic Information Hiding in Plain Text", 2001, dissertation, 165 pages.*

Murphy, "The syntax of concealment: reliable methods for plain text information hiding", Trinity College, Dublin, Ireland, Feb. 27, 2007, 12 pages.*

Chang, "Practical Linguistic Steganography using Contextual Synonym Substitution and Vertex Colour Coding", Proceedings of the 2010 Conference on Empirical Methods in Natural Language Processing, Oct. 9-11, 2010, pp. 1194-1203.*

Kewley, "Dynamic Approaches to Thwart Adversary Intelligence Gathering", IEEE, 2001, pp. 176-185.*

Thompson, "Blog Spam: A Review", Feb. 15, 2007, 4 pages.*

Diffie, "Privacy on the Line: The Politics of Wiretapping and Encryption", 2007, MIT ePress books, pp. 337-392.*

Means, "A Powerful and general approach to content exploitation in natural language processing", May 2004, CLS'04 Proceedings of the HLT-NAACL Workshop on Computational Lexical Semantics, pp. 17-22.*

* cited by examiner

| File | Time Zone Used in Database File |
|---|---|
| CAPACITY | GMT |
| DSO | Not Implemented Yet |
| EUF | GMT |
| HLR | Local |
| LOAD | Local |
| RATE | GMT |

(This is a test of securing content and Presentation project. The DataAccess projects use variants of the ActiveRecord[1] and UnitOfWork[2] design patterns to abstract away the database. Each file type will have a corresponding File class (e.g. the Capacity file has a CapacityFile class that handles all interaction with files of that type). Each table in the databases will have a corresponding Table class and Record class. When you open a file, the entire database file is read into object instances in memory (don't worry, it's very fast). This is handled by the File and Table classes. The DataAccess classes work together to track all modifications to the data so that they can be persisted to the database when the user "saves the file".

Many of the code files in the DataAccess projects are automatically generated via a custom tool. Please don't modify these files. (You can identify these by a comment at the top of the file.)

| File | Time Zone Used in Database File |
|---|---|
| CAPACITY | GMT |
| DSO | Not Implemented Yet |
| EUF | GMT |
| HLR | Local |
| LOAD | Local |
| RATE | GMT |

This is a test
ActiveRecord
correspondin
files of that ty
When you op
very fast). Th
modification
Many of the
don't modify Tables in th 1 http://martin
2 http://martinfowler.com/eaaCatalog/unitOfWork.html and http://www.codeinsanity.com/2008/09/unit-of-work-pattern.html project. The DataAccess projects use variants of the
abstract away the database. Each file type will have a
a CapacityFile class that handles all interaction with
have a corresponding Table class and Record class.
d into object instances in memory ( don't worry, it's
sses. The DataAccess classes work to gether to track all
sted to the database when the user "saves the file."

re automatically generated via a custom tool. Please
a comment at the top of the file.)

es:
710

Context menu:
- Cut
- Copy
- Paste
- Font...
- Paragraph...
- Bullets and Numbering...
- Hyperlink...
- Look Up...
- Synonyms
- Translate
- Select Text with Similar Formatting
- Secure Text

| File | Time Zone Used in Database File |
|---|---|
| CAPACITY | GMT |
| DSO | Not Implemented Yet |
| EUF | GMT |
| HLR | Local |
| LOAD | Local |
| RATE | GMT |

805

Each file type has a corresponding DataAccess project and Presentation project. The DataAccess projects use variants of the ActiveRecord[1] and UnitOfWork[2] design patterns to abstract away the database. Each file type will have a corresponding File class (e.g. the Capacity file has a CapacityFile class that handles all interaction with files of that type). Each table in the databases will have a corresponding Table class and Record class. When you open a file, the entire database file is read into object instances in memory (don't worry, it's very fast). This is handled by the File and Table classes. The DataAccess classes work together to track all modifications to the data so that they can be persisted to the database when the user "saves the file".

Many of the code files in the DataAccess projects are automatically generated via a custom tool. Please don't modify these files. (You can identify these by a comment at the top of the file.)

APPARATUS, METHOD, AND COMPUTER PROGRAM FOR PROVIDING DOCUMENT SECURITY

CROSS-REFERENCE TO RELATED APPLICATION

This application claims the benefit of U.S. Provisional Patent Application No. 61/481,822, filed on May 3, 2011, the subject matter of which is hereby incorporated by reference in its entirety.

FIELD

The present invention relates to restricting access to a digital document and, more particularly, to restricting access to a portion of the content in a digital document rather than the entire document.

BACKGROUND

Security can be a major concern when transmitting a digital document (hereinafter "document"), such as a document in MICROSOFT WORD® format, MICROSOFT EXCEL® format, MICROSOFT VISIO® format, ADOBE ACROBAT® format, etc., via email for another user to view. However, certain content in a document may be sensitive while other content is not sensitive. In such a case, it may be beneficial to provide restricted access to a portion of the content in a document instead of the entire document.

Furthermore, conventional security applications do not replace the sensitive (or secured) content of the document with replacement content to hide the intent of a user (e.g., content author). Thus, it may also be beneficial to camouflage, rather than encrypt, the content in the document in order to hide the intent of the content author.

SUMMARY

Certain embodiments of the present invention may provide solutions to the problems and needs in the art that have not yet been fully identified, appreciated, or solved by current document security systems. For example, a security module may allow a user to specify the content that is considered to be sensitive and toggle views to hide or show sensitive information.

In accordance with an embodiment of the present invention, a computer program is embodied on a non-transitory computer-readable medium. The computer program is configured to cause a processor to convert one or more sections of a document into secured content. The processor is further configured to remove the secured content from the document, and replace the secured content with replacement content in the document.

In another embodiment of the present invention, a computer-implemented method includes converting one or more sections of document into secured content. The computer-implemented method also includes removing the secured content from the document, and replacing the secured content with replacement content in the document.

In yet another embodiment of the present invention, an apparatus includes a physical memory that includes computer program instructions, and a processor coupled to the physically memory. The computer program instructions, when executed, are configured to cause the processor to convert one or more sections of a document into secured content. The processor is further configured to remove the secured content from the document, and replace the secured content with replacement content in the document.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

Embodiments of the present invention may include a security module that allows a user to specify the content that is considered to be sensitive, and toggle views to hide or show the sensitive content. In another embodiment, a translation or communication layer module may act as an intermediate layer between the security module and a storage layer module. The communication layer module may provide features such as user interface security, communication and protection of sensitive information within the storage layer module, document type flexibility, content classification, author administrative utilities, etc. In yet another embodiment, the storage layer module may include the sensitive content, and act as a second layer in returning the sensitive information to the communication layer module.

Figure 1:
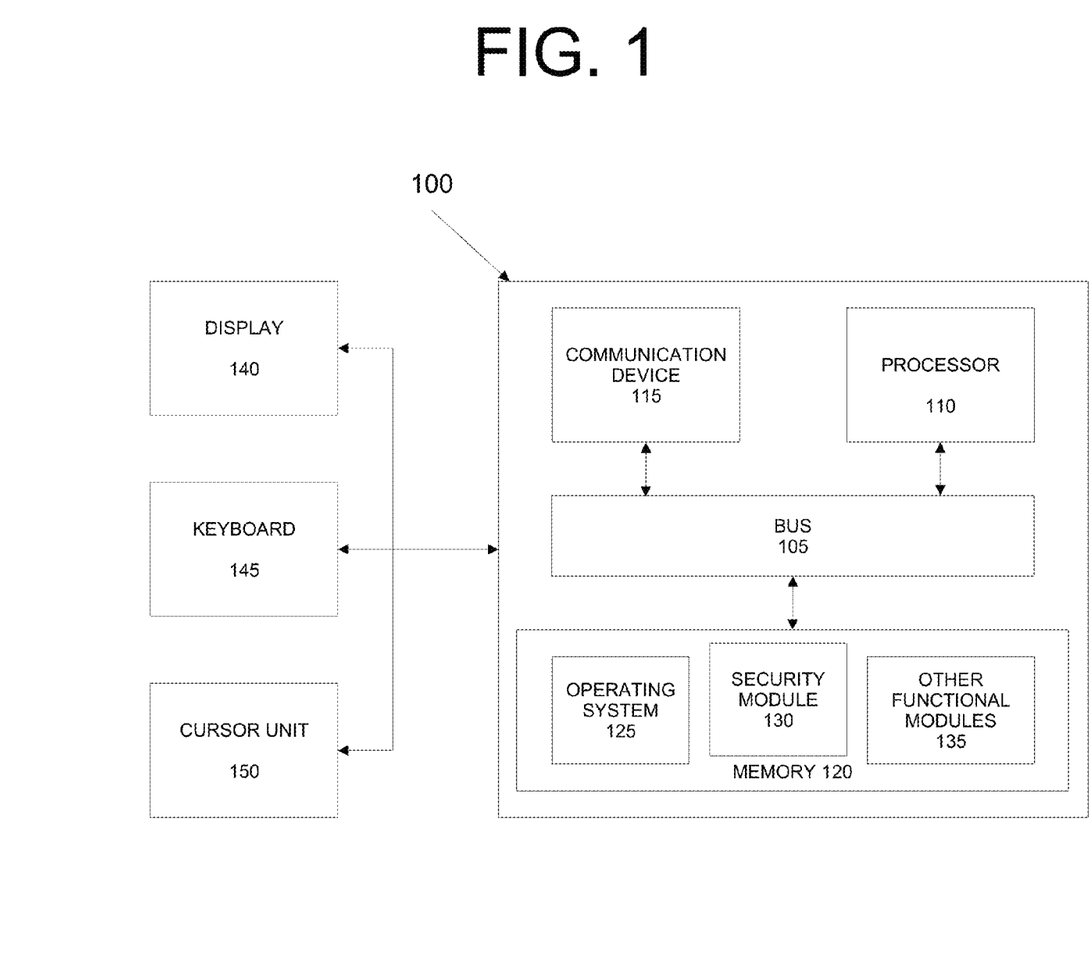
FIG. 1 illustrates a block diagram of a system for securing one or more sections of a document, according to an embodiment of the present invention.

FIG. 1 illustrates a block diagram of a system 100 for securing one or more sections of a document, according to an embodiment of the present invention. System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of computer readable medium. System 100 may also include a communication device 115, such as a network interface card, that may provide access to a network.

The computer readable medium may be any available media that can be accessed by processor 110. The computer readable medium may include both volatile and nonvolatile medium, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 140 may display information to the user. A keyboard 145 and a cursor control unit 150, such as a computer mouse, may also be coupled to bus 105 to enable the user to interface with system 100.

According to one embodiment, memory 120 may store software modules that may provide functionality when executed by processor 110. The modules can include an operating system 125 and a security module 130, as well as other functional modules 135. Operating system 125 may provide operating system functionality for system 100. Security module 130 may allow a user to specify the content that is considered to be sensitive and toggle views to hide or show sensitive information. Furthermore, security module 130 may convert sensitive content to hidden or viewable based on the privileges assigned to the user accessing the document. Security module may also convert the sensitive content to hidden or viewable content based on whether the sensitive content is located in storage layer module.

Because system 100 may be part of a larger system, system 100 may include one or more additional functional modules 135 to include the additional functionality. For example, functional modules 135 may include a translation or communication layer module that may act as an intermediate layer between the security module and a storage layer module, and provide features such as user interface security, communication and protection of sensitive information within the storage layer module, document type flexibility, content classification, author administrative utilities, etc. The communication layer module may also handle details with respect to compression, protocol, and encryption of the sensitive content.

Functional modules 135 may also include a storage layer module that includes sensitive (or secured) content and is configured to act as a second layer of security in returning the secured content to the communication layer module. For example, the storage layer module is configured to store and retrieve secured content to provide an additional layer of security. The storage layer module may be located at a third-party location or any location that would enhance security of the secured content.

It should be appreciated that the communication layer module and the storage layer module may be configured on a remote server. The remote server may manage the user access and request for retrieval and storage of the secured content that is running on the remote server. The remote server may also store and retrieve the secured content from a database that is only accessible by the remote server.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
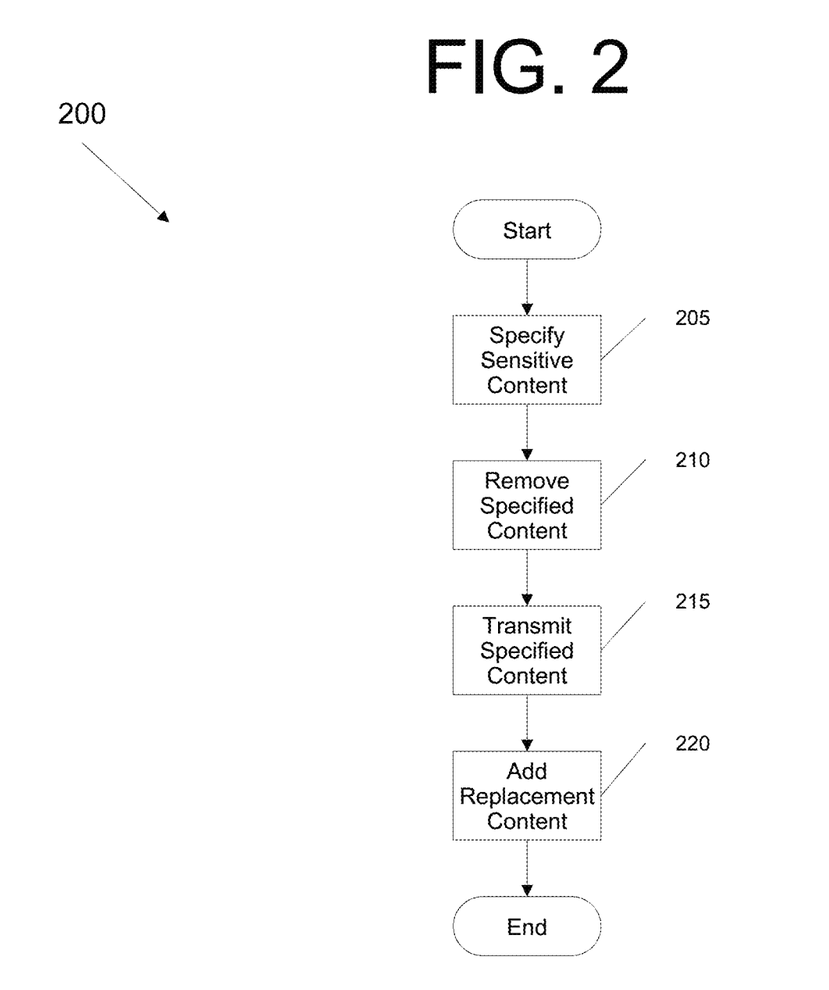
FIG. 2 illustrates a flowchart of a method for securing content in a document, according to an embodiment of the present invention.

FIG. 2 illustrates a flowchart of a method 200 for securing content in a document, according to an embodiment of the present invention. The method of FIG. 2 may be executed by, for example, the system of FIG. 1 in some embodiments. The method includes specifying sensitive content in a document after the document has been created at 205. At 210, the specified sensitive content is removed from the document, and is transmitted to the storage layer module at 215 using the communication layer module. The removed content may be compressed and encrypted to securely transmit the removed content to the storage layer module. It should be appreciated that the sensitive content may not be stored in the document, but stored in the storage layer module for added protection. At 220, the removed sensitive content is replaced with alternative content to camouflage or hide the intent of the user (e.g., the content author). The alternative content may not provide a user, or any process, with an indication that there was sensitive content in the document.

Figure 3:
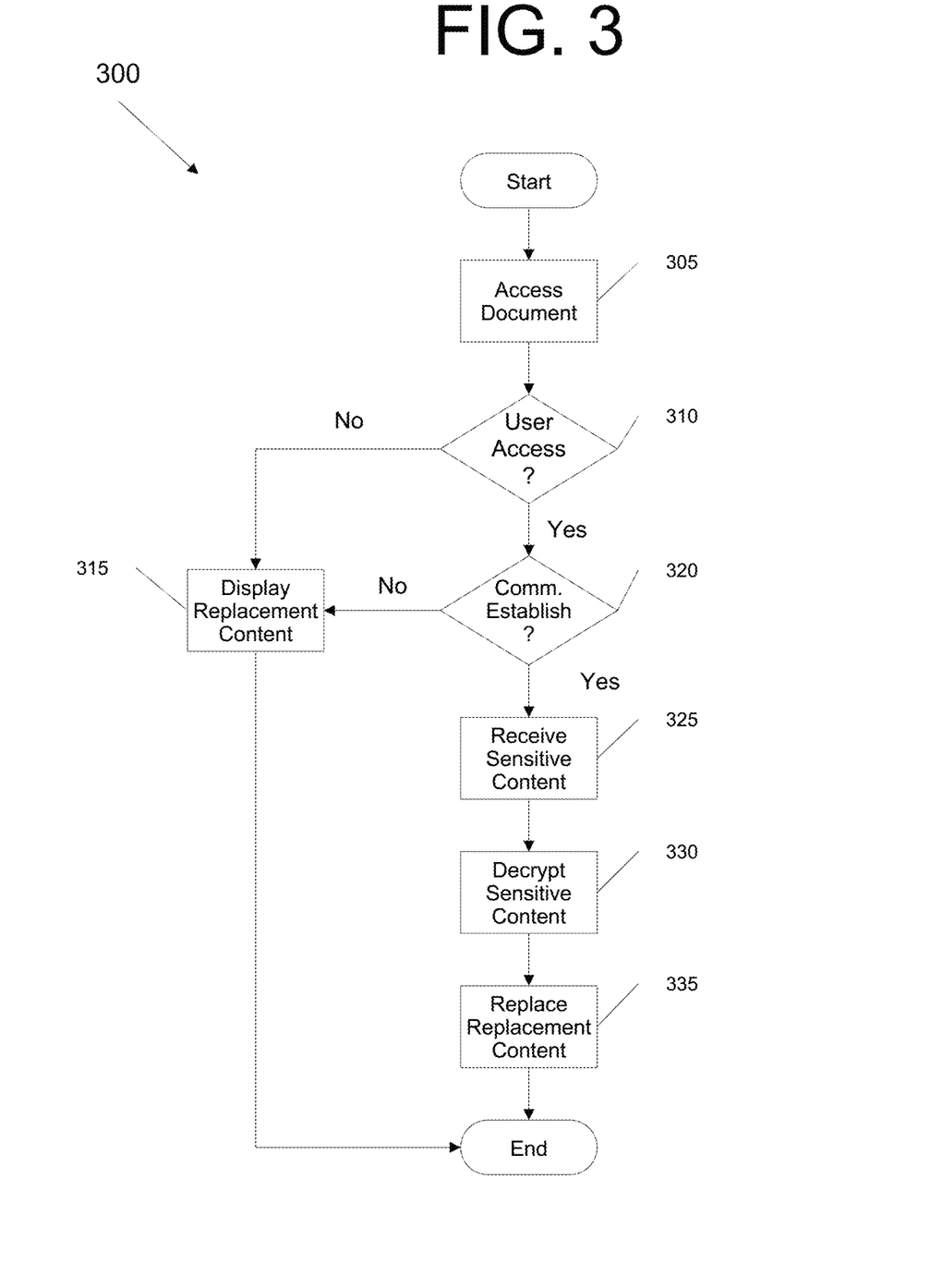
FIG. 3 illustrates a flowchart of a method for allowing a user to view sensitive content, according to an embodiment of the present invention.

FIG. 3 illustrates a flowchart of a method 300 for allowing a user to view sensitive content, according to an embodiment of the present invention. The method of FIG. 3 may be executed by, for example, the system of FIG. 1 in some embodiments. The method includes accessing the document using a computing system at 305. At 310, the computing system determines whether the user has access to the sensitive content in the document when the document is launched or opened, for example. In an alternative embodiment, the computing system determines whether the user has access to the sensitive content in the document when the user performs a "right-click" operation on the replaced text. To determine whether the user has access to the sensitive content, the computing system may query a third-party service, or a remote server, based on the user's credentials and/or tag(s) in the document. Because each tag associated with the sensitive content may be unique, the tag may not be duplicated. The tag identifies an area or section of the document, but is not changed by the content of the section or area.

If the user does not have access to the sensitive data in the document, then the computing system at 315 displays unsecured content, along with alternative content, to camouflage the intent of the content author. If the user has access to the sensitive content in the document, then the computing system at 320 determines whether communication is established with the storage layer module. If communication cannot be established, then the computing system at 315 displays unsecured content, along with alternative content, to camouflage the intent of the content author. In an alternative embodiment, the computing system may perform a periodic check of whether communication is established with the storage layer module.

If communication has been established with the storage layer module, then the computing system at 325 receives the sensitive content, and decompresses and decrypts the sensitive content at 330. At 335, the computing system replaces the replacement content with the sensitive content in order to allow the user to view the secured content.

The method steps shown in FIGS. 2 and 3 may be performed, in part, by a computer program, encoding instructions for a nonlinear adaptive processor to cause at least the methods described in FIGS. 2 and 3 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 2 and 3, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Figure 4:
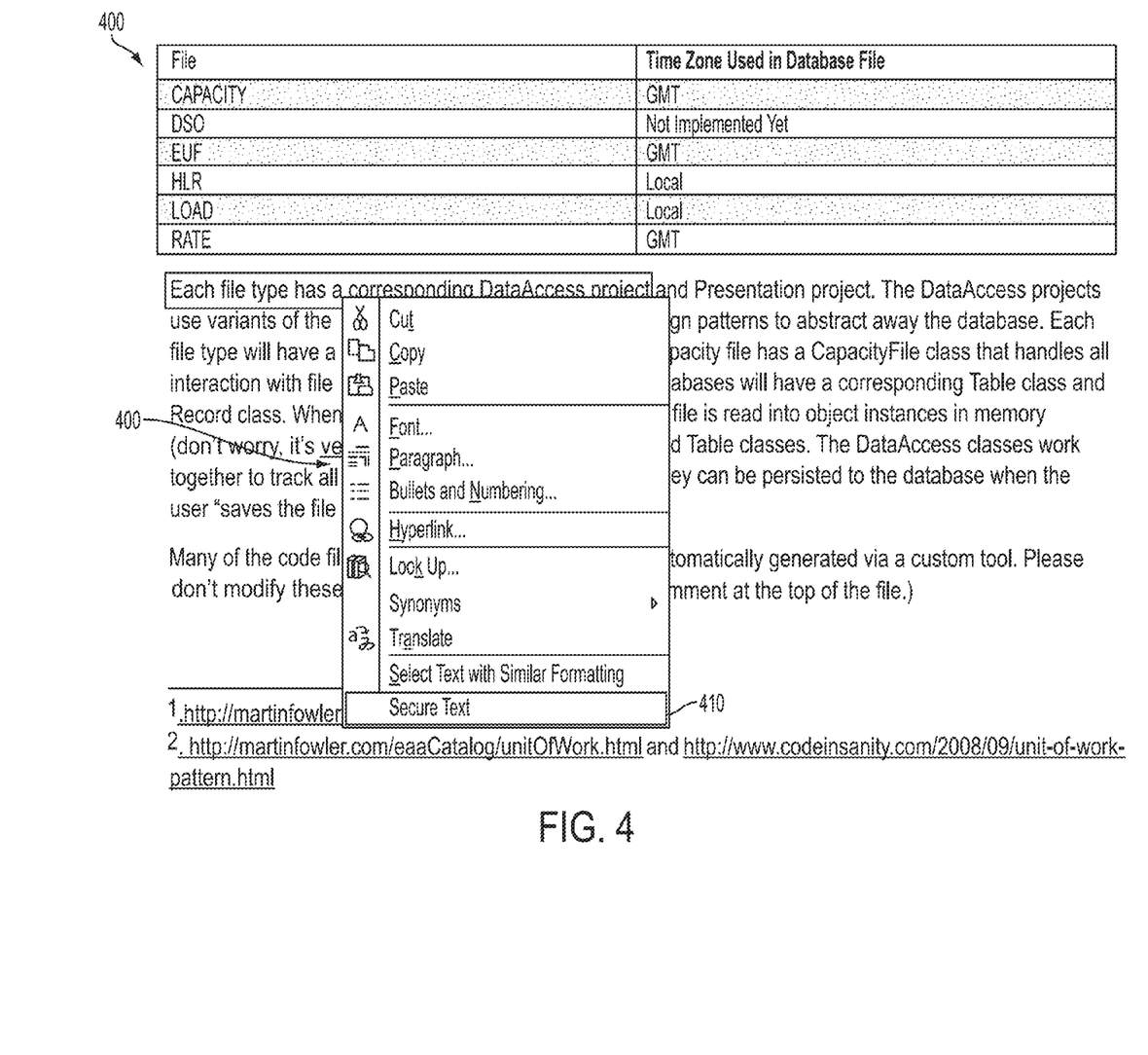
FIG. 4 illustrates a graphical user interface (GUI) that shows selection of content, according to an embodiment of the present invention.

FIG. 4 illustrates a GUI 400 that shows selection of content, according to an embodiment of the present invention. GUI 400 shows a user selecting content, or text, that the user would like to classify as sensitive or secure. In this embodiment, the user may select the content and perform a right-click operation, for example, to launch a pop-up menu 405. Pop-up menu 405 may include an option 410 to secure the text.

Figure 5:
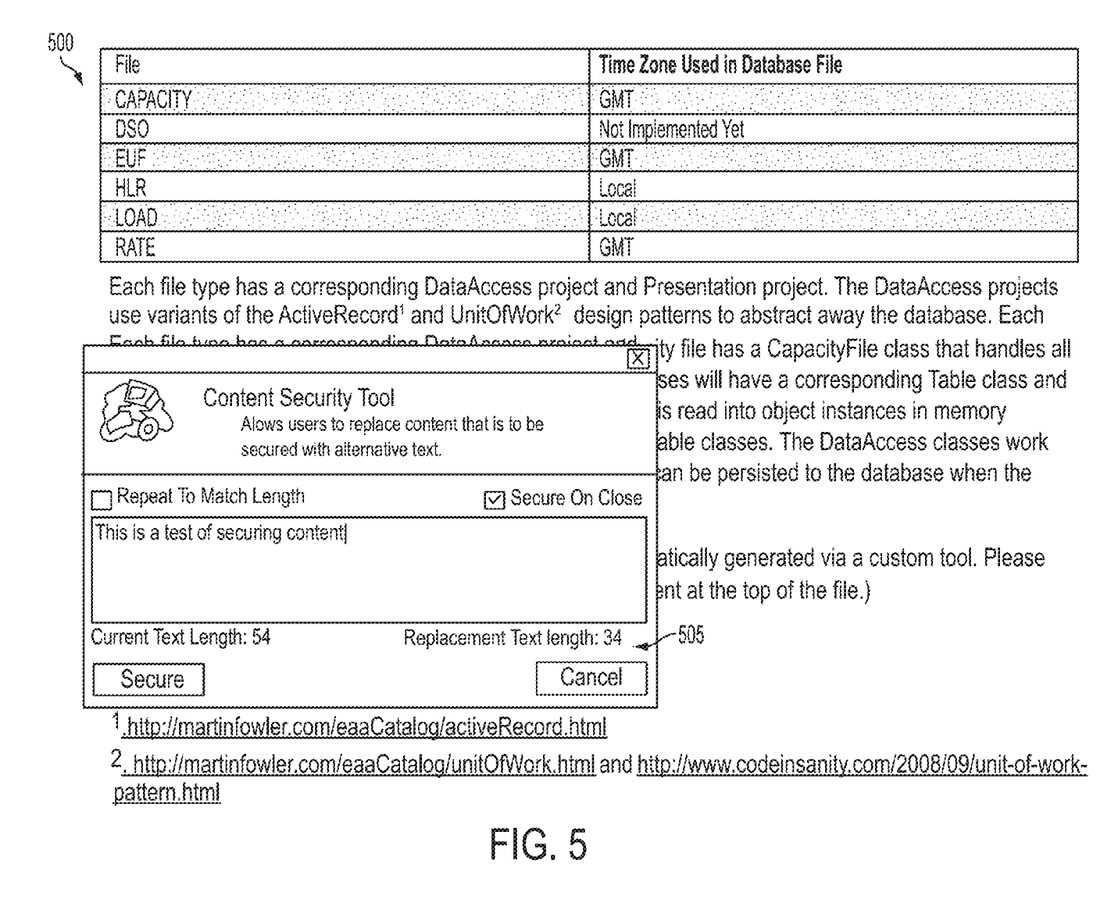
FIG. 5 illustrates a GUI that shows replacement of secured content with replacement content, according to an embodiment of the present invention.

FIG. 5 illustrates a GUI 500 that shows replacement of secured content with replacement content, according to an embodiment of the present invention. GUI 500 shows a replacement dialog box 505 that allows the user to replace the selected content with general content to camouflage the intent of the user. For example, dialog box 505 includes an interface that allows the user to enter replacement content and provide the option to secure on close, or at a later time, depending on configuration. In this embodiment, the secured content can be replaced with the replacement content and removed from the document. The removed content may then be transmitted to a storage device for retrieval at a later time.

Figure 6:
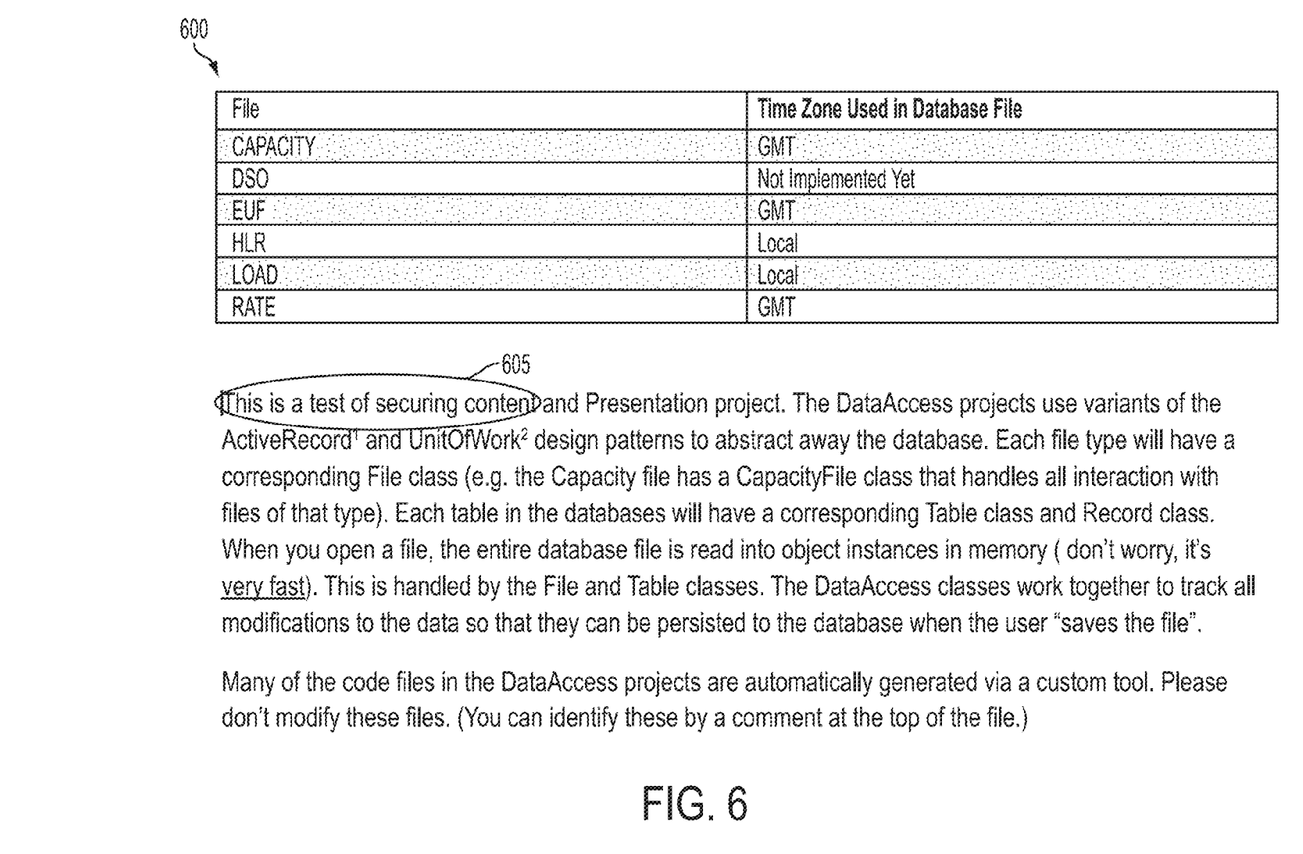
FIG. 6 illustrates a GUI that shows replacement content, according to an embodiment of the present invention.

FIG. 6 illustrates a GUI 600 that shows replacement content 605, according to an embodiment of the present invention. For example, GUI 600 shows replacement content 605 that was inserted in place of the secured content from FIG. 5.

Figure 7:
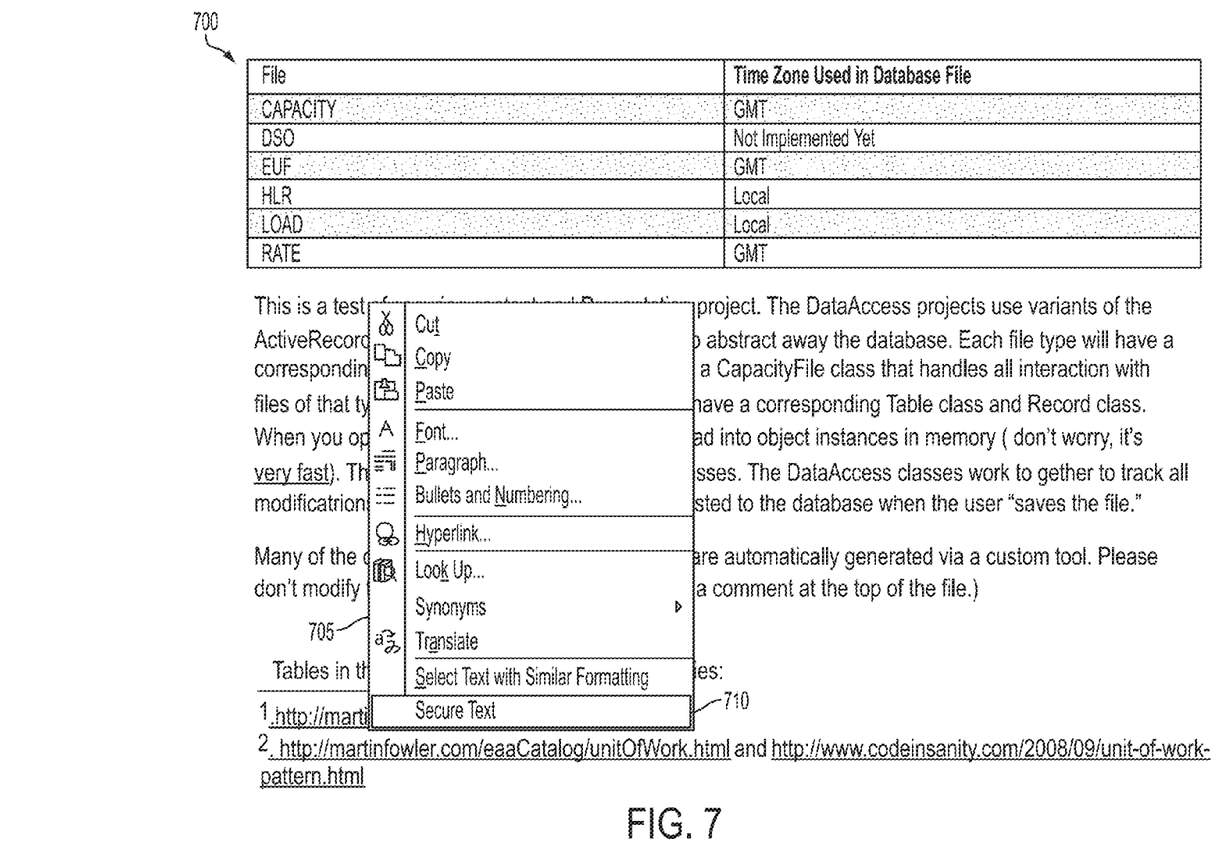
FIG. 7 illustrates a GUI that shows a secured content replacement tool, according to an embodiment of the present invention.
Figure 8:
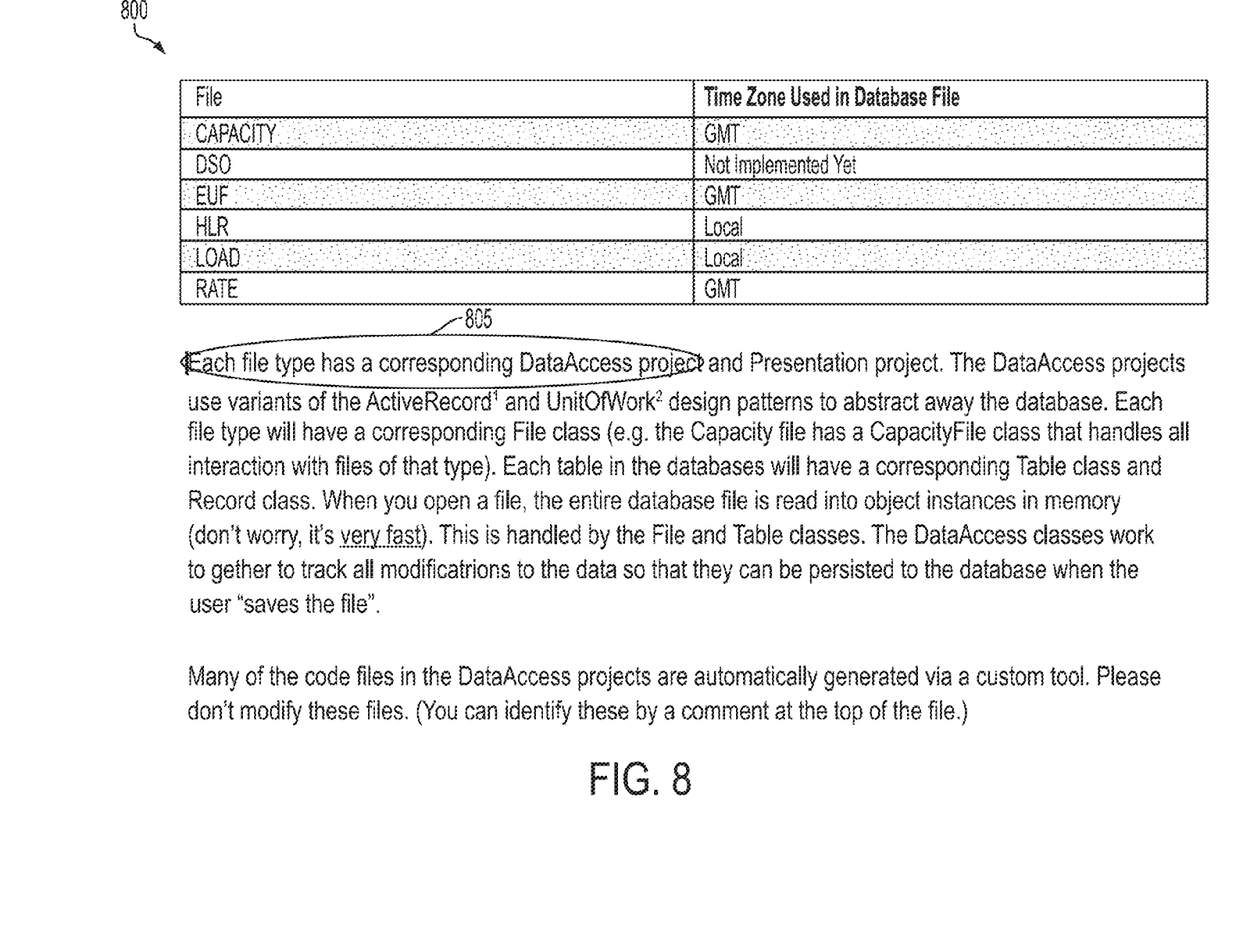
FIG. 8 illustrates a GUI that shows the secured content, according to an embodiment of the present invention.

FIG. 7 illustrates a GUI 700 that shows a secured content selection tool, according to an embodiment of the present invention. When, for example, the user performs a right-click operation in the document, a pop-up 705 will open. Pop-up 705 may include the option to "show secured text" 710. FIG. 8 illustrates a GUI 800 that shows secured content 805 when the user selects the "show secured text" 710 from FIG. 7, according to an embodiment of the present invention. In this example, the secured content is returned to the document and displayed. However, it should be appreciated that the secured content may not be stored in the document, but instead stored in a storage layer module or database to provide optimum security.

Figure 9:
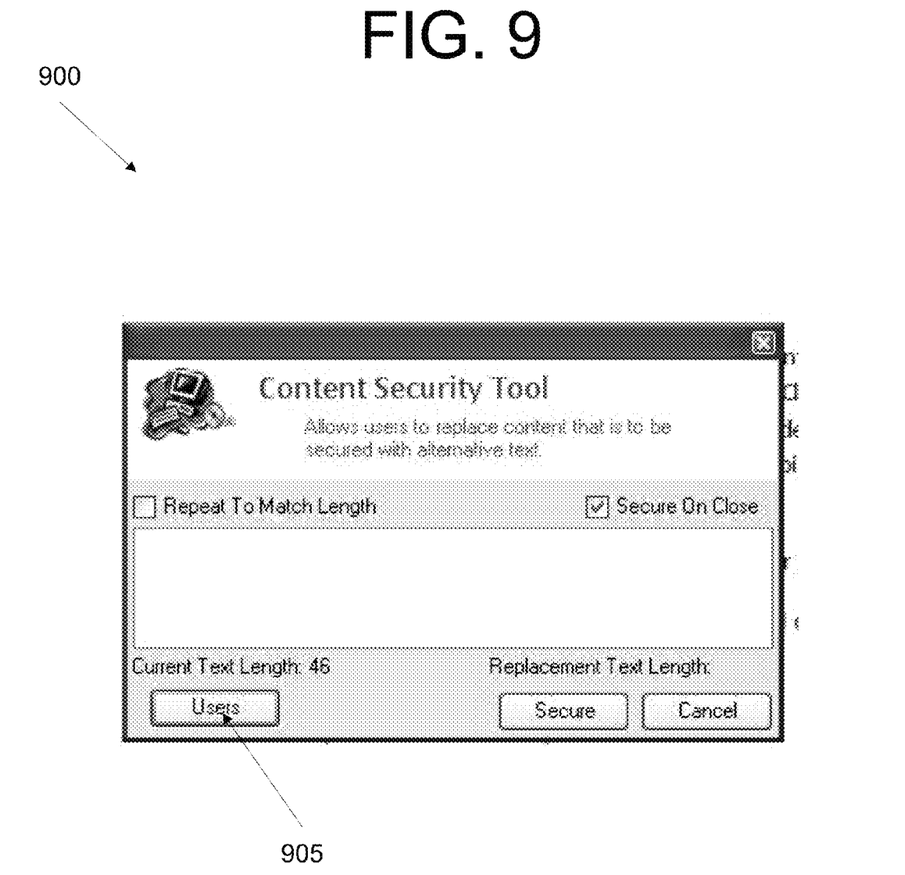
FIG. 9 illustrates a GUI that allows a user to initiate viewing privileges for additional users, according to an embodiment of the present invention.
Figure 10:
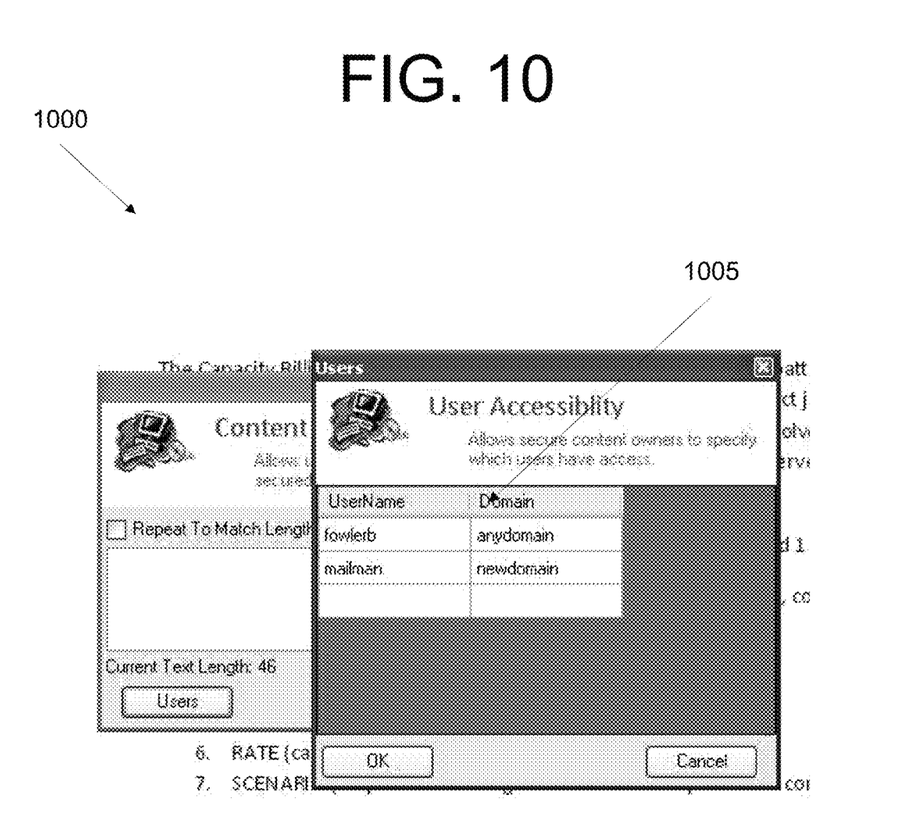
FIG. 10 illustrates a GUI that allows a user to assign viewing privileges for additional users, according to an embodiment of the present invention

FIG. 9 illustrates a GUI 900 that allows a user to initiate viewing privileges for additional users, according to an embodiment of the present invention. In this embodiment, GUI 900 shows a users button 905 that may be selected by the user. When, for example, the user selects users button 905, user accessibility pop-up 1000 is opened, as shown in FIG. 10. User accessibility pop-up 1000 allows the user to assign additional users 1005 with different levels of privileges, e.g., full, limited, or no viewing privileges.

It should be appreciated that viewers may be shown the secured content when they have been granted permission to view the secured content. If the viewer does not have permission, then the secured content is not shown and only the replacement content is shown. It should be further appreciated that the secured content may be replaced with the replacement content once the document is closed. If the document is saved, the document may save with the replacement content and not the secured content.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable medium, the computer program configured to cause a processor to:
  convert one or more sections of a document into at least one secured word;
  remove the at least one secured word from the document;
  perform a periodic check to determine whether communication with a secure storage layer is established to provide user interface security and if the periodic check shows established communication, the secured word is at least one of encrypted, compressed and transmitted and received, decompressed and decrypted;
  replace the at least one secured word with at least one replacement word in the document, wherein the at least one replacement word is camouflaged to resemble at least one unsecured general word, wherein if the periodic check does not show established communication and communication fails to be established the document displays unsecured content and alternative content to camouflage an intent of an author associated with the document and wherein the document appears as an unsecured document, the secured content having been removed from the document;
  receive a request to access to the document from a user;
  determine if the user is authorized;
  display at least one unsecured word and the at least one replacement word in the document when a user is unauthorized; and
  display at least one unsecured word and the at least one secured word in the document when a user is authorized.

2. The computer program of claim 1, wherein the computer program is further configured to cause the processor to receive a selection of the one or more sections to be secured from an author of the at least one word.

3. The computer program of claim 1, wherein the computer program is further configured to cause the processor to compress and encrypt the at least one secured word when the at least one secured word is removed.

4. The computer program of claim 3, wherein the computer program is further configured to cause the processor to transmit the compressed and encrypted at least one secured word to a remote database.

5. The computer program of claim 1, wherein the computer program is further configured to cause the processor to determine whether a user is authorized to view the at least one secured word in the document based on viewing privileges pre-assigned to the user.

6. A computer-implemented method, comprising:
  converting, by a processor, one or more sections of a document into at least one secured word;
  removing, by the processor, the at least one secured word from the document;
  performing a periodic check to determine whether communication with a secure storage layer is established to provide user interface security and if the periodic check shows established communication, the secured word is at least one of encrypted, compressed and transmitted and received, decompressed and decrypted;
  replacing, by the processor, the at least one secured word with at least one replacement word in the document, wherein the at least one replacement word is camouflaged to resemble at least one unsecured general word, wherein if the periodic check does not show established communication and communication fails to be established the document displays unsecured content and alternative content to camouflage an intent of an author associated with the document, wherein the document appears as an unsecured document, the secured content having been removed from the document;
  receiving a request to access to the document from a user;
  determining if the user is authorized;
  displaying at least one unsecured word and the at least one replacement word in the document when a user is unauthorized; and
  displaying at least one unsecured word and the at least one secured word in the document when a user is authorized.

7. The computer-implemented method of claim 6, further comprising:
  receiving a selection of the one or more sections to be secured from an author of the at least one word.

8. The computer-implemented method of claim 6, further comprising:
  compressing and encrypting the at least one secured word when the at least one secured word is removed; and
  transmitting the compressed and encrypted at least one secured word to a remote database for storage.

9. The computer-implemented method of claim 6, further comprising:
  determining whether a user is authorized to view the at least one secured word in the document based on viewing privileges pre-assigned to the user.

10. An apparatus, comprising:
  physical memory comprising computer program instructions; and
  a processor coupled to the physical memory, wherein
  the computer program instructions, when executed, are configured to cause the processor to:
  convert one or more sections of a document into at least one secured word;
  remove the at least one secured word from the document;
  perform a periodic check to determine whether communication with a secure storage layer is established to provide user interface security and if the periodic check shows established communication, the secured word is at least one of encrypted, compressed and transmitted and received, decompressed and decrypted;
  replace the at least one secured word with at least one replacement word in the document, wherein the at least one replacement word is camouflaged to resemble at least one unsecured general word, wherein if the periodic check does not show established communication and communication fails to be established the document displays unsecured content and alternative content to camouflage an intent of an author associated with the document, wherein the document appears as an unsecured document, the secured content having been removed from the document;
receive a request to access to the document from a user;
determine if the user is authorized;
display at least one unsecured word and the at least one replacement word in the document when a user is unauthorized; and
display at least one unsecured word and the at least one secured word in the document when a user is authorized.

11. The apparatus of claim 10, wherein the processor is configured to determine whether a user is authorized to view the at least one secured word in the document based on viewing privileges pre-assigned to the user.

* * * * *